(12) United States Patent
Alavi et al.

(10) Patent No.: US 6,983,029 B2
(45) Date of Patent: Jan. 3, 2006

(54) BLIND CHANNEL ESTIMATION AND DATA DETECTION FOR PSK OFDM-BASED RECEIVERS

(75) Inventors: Hossein Alavi, Mississauga (CA); Mohammad Javad Omidi, Mississauga (CA); Mehdi Tavassoli Kilani, Mississauga (CA); Ahmad Chini, Vaughan (CA)

(73) Assignee: Maxim Integrated Products, Inc., Sunnyvale, CA (US)

( * ) Notice: Subject to any disclaimer, the term of this patent is extended or adjusted under 35 U.S.C. 154(b) by 530 days.

(21) Appl. No.: 09/940,381

(22) Filed: Aug. 27, 2001

(65) Prior Publication Data

US 2003/0007576 A1 Jan. 9, 2003

Related U.S. Application Data

(60) Provisional application No. 60/255,830, filed on Dec. 15, 2000.

(51) Int. Cl.
*H03D 3/22* (2006.01)
*H04L 27/22* (2006.01)

(52) U.S. Cl. .................... 375/329; 375/379; 375/260; 329/304

(58) Field of Classification Search ............... 375/269, 375/279–283, 329–333; 329/304–310; 719/760, 719/797; 370/208
See application file for complete search history.

(56) References Cited

U.S. PATENT DOCUMENTS

| | | | |
|---|---|---|---|
| 4,503,545 A | | 3/1985 | Bremer et al. |
| 4,566,100 A | | 1/1986 | Mizuno et al. |
| 6,055,281 A | * | 4/2000 | Hendrickson et al. ...... 375/329 |
| 6,381,288 B1 | * | 4/2002 | He et al. .................... 375/330 |
| 6,393,599 B1 | * | 5/2002 | Chan .......................... 714/797 |
| 6,487,255 B1 | * | 11/2002 | Arslan et al. ............... 375/262 |
| 6,683,921 B1 | * | 1/2004 | Shiraishi et al. ............ 375/331 |
| 6,735,255 B1 | * | 5/2004 | Smart et al. ................ 375/260 |
| 2004/0008618 A1 | * | 1/2004 | Shirakata et al. .......... 370/208 |

FOREIGN PATENT DOCUMENTS

| | | |
|---|---|---|
| DE | 3433962 A | 3/1986 |
| EP | 0866580 A | 9/1998 |
| EP | 0987863 A | 3/2000 |

OTHER PUBLICATIONS

Porath, J–E, et al., "Improved Technique for Quick Error Rate Estimation of Multi–Dimensional Communications Schemes" IEE Proceedings: Communications, Institution of Electrical Engineers, GB, vol. 146, NR. 6, Page(s) 343–346, XP006013250, ISSN: 1350–2425.

* cited by examiner

*Primary Examiner*—Phuong Phu
(74) *Attorney, Agent, or Firm*—Blakely, Sokoloff, Taylor & Zafman LLP

(57) ABSTRACT

In general, one embodiment of the invention relates to a method for detecting data bits and estimating the channel reliability of each carrier. The detection method comprises (i) computing a complex phase difference between a current symbol and a previous symbol, (ii) separating a real value component (R) from a corresponding imaginary value component (I) forming the complex phase difference, (iii) determining at least one boundary constraint line of a complex phase map for a selected demodulation scheme, and computing an arithmetic combination of the real value component and the corresponding imaginary value component to detect whether a series of bits falls within a selected region of the complex phase map defined by the at least one boundary constraint line. Over N symbols propagating over a carrier, including the current symbol and the previous symbol, the channel estimation counts a number of symbols (less than N but greater than a threshold) that fall within an estimated area of the complex phase map. The estimated area is bound by boundary constraint lines based on a parameterized real value component.

24 Claims, 5 Drawing Sheets

BLIND CHANNEL ESTIMATION AND DATA DETECTION FOR PSK OFDM-BASED RECEIVERS

This application claims the benefit of priority on U.S. Provisional Application No. 60/255,830 filed Dec. 15, 2000.

FIELD

The invention relates to the field of communications. In particular, one embodiment of the invention relates to a system and method for symbol detection and for estimating carrier quality over an existing communication line.

GENERAL BACKGROUND

For many years, a number of modulation techniques have been used to transfer data from a source to a destination. One type of modulation technique is referred to as multi-carrier modulation (MCM). In accordance with MCM, data is split into several data components and each of these data components is transmitted over separate carriers so that each individual carrier has a narrower bandwidth than the composite signal. In general, a "carrier" (sometimes referred to as a "tone") is an electromagnetic signal transmitted generally at a steady base frequency of alternation on which information can be imposed. Of course, when used in connection with fiber optic medium, the carrier may be a light beam on which information can be imposed. The frequency range of the carrier may be referred to as a "frequency slot" or "frequency bin".

Currently, there exist a number of multi-carrier modulation schemes such as Orthogonal Frequency Division Multiplexing (OFDM) for example. OFDM subdivides the available spectrum into a number of narrow band channels (e.g., 50 channels or more). The carriers for each channel may be spaced close together and each carrier is configured to be orthogonal to its adjacent carriers. This orthogonal relationship may be achieved by setting each carrier to have an integer number of cycles over a symbol period. Thus, the spectrum of each carrier has a null at the center frequency of each of the other carriers in the system. This results in no interference between the carriers, allowing them to be spaced as close as theoretically possible.

In particular, OFDM modulation is performed by encoding data onto individual carriers in the frequency domain. This encoding may be accomplished by a Fast Fourier Transform (FFT) engine. For instance, DQPSK modulation involves two-bits of data being encoded on to each carrier. An inverse FFT (IFFT) is performed on the set of frequency carriers, converting to the time domain and producing a single OFDM symbol. The OFDM symbol is then sent through a channel using a digital-to-analog converter (DAC).

Normally, receivers for MCM systems include an analog-to-digital converter (ADC) that is used to sample the data and route the sampled data to a FFT engine. The FFT engine detects data bits placed on a carrier by computing the phase of successive complex differential signals. Such computations are time consuming and require substantial processing power.

After detection, it is sometimes desirable for the MCM system to estimate the quality of the carrier in order to determine if the carrier transferring the data is unreliable. A carrier may be deemed "unreliable" where it is experiencing unfavorable channel characterizations (e.g., fading, thermal noise, high degree of interference, etc.). One type of estimation scheme is referred to as "data based channel estimation" in which knowledge of the test data is required. Pilot tones are sometimes used as the test data.

Another type of estimation scheme is referred to as "blind channel estimation," where the receiver has no knowledge of the transmitted data. This lack of knowledge makes it more difficult to accurately estimate whether a carrier of a frequency band is reliable.

BRIEF DESCRIPTION OF THE DRAWINGS

The features and advantages of the invention will become apparent from the following detailed description of the invention in which.

DETAILED DESCRIPTION

Figure 1:
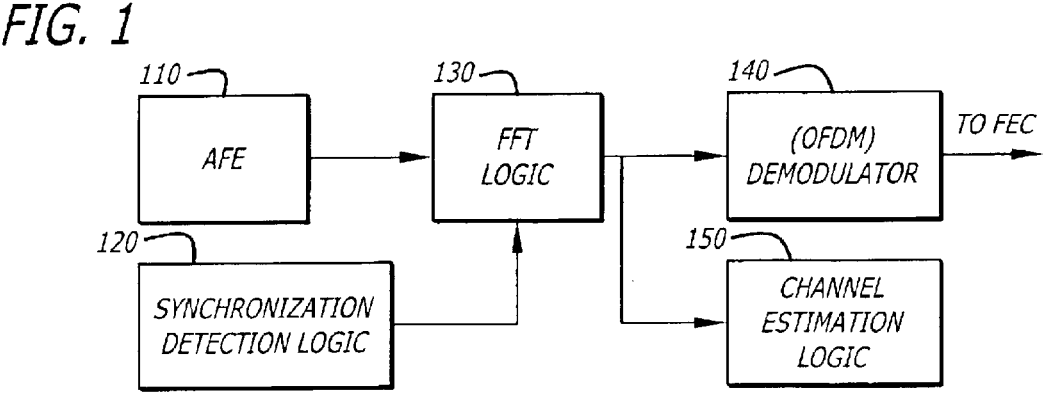
FIG. 1 is an exemplary embodiment of an Orthogonal Frequency Division Multiplexing (OFDM) receiver.

Herein, the exemplary embodiments of the invention relate to a detection method and channel estimation scheme used to communicate modulated information over a line. These embodiments are not exclusive; rather, they merely provide a thorough understanding of the invention. Well-known circuits are not set forth in detail in order to avoid unnecessarily obscuring the invention.

In the following description, certain terminology is used to describe features of the present invention. For example, "logic" or "unit" generally describes hardware and/or software module(s) that perform a certain function on incoming information. A "software module" includes code that, when executed, performs a certain function. The software module(s) may be stored in a machine readable medium, which could be provided as an electronic circuit, a semiconductor memory device, a read only memory (ROM), a flash memory, an erasable programmable ROM (EPROM), a floppy diskette, a compact disk, a digital video disk, an optical disk, a hard disk, a fiber optic medium, or a radio frequency (RF) link for example. The logic, as hardware, may be employed as an integrated circuit such as a processor (e.g., a digital signal processor, a microprocessor, etc.), a micro-controller, an application specific integrated circuit (ASIC) and the like.

The term "information" is defined as voice, data, address, and/or control. In general, the term "symbol" is referred to as data embodied in a carrier. For BPSK modulation, the symbol may be a single data bit having a logical value of "1" or "0". For QPSK modulation, however, the symbol may be a two data bit having a logical value of "00", "01", "10" or "11". However, a specific type of symbol, referred to herein as an "OFDM symbol," is a signal that encodes data bits for each of the carriers associated with a given frequency band. Symbols may be used for a variety of purposes. For instance, symbols may be used to synchronize information transmitted in parallel over different lines and perhaps different channels. A logical operator "NOT" involves a bitwise inversion of a series of bits (one or more bits) such as a most significant bit or a least significant bit for example.

In addition, a "line" is generally defined as one or more physical or virtual information-carrying mediums to establish a communication pathway. Examples of the medium include a physical medium (e.g., electrical wire, optical fiber, cable, bus traces, etc.) or a wireless medium (e.g., air in combination with wireless signaling technology). In one embodiment, the line may be an Alternating Current (AC) power line, perhaps routing information in accordance with a current or future HOMEPLUG™ standard. One version of the HOMEPLUG™ standard is "HomePlug 1.0 Specification" published on or around Jun. 30, 2001.

In the transmission of an Orthogonal Frequency Division Multiplexing (OFDM) signaling over a line, symbols in a Phase Shift Keying (PSK) format (e.g., Binary PSK "BPSK", Quaternary PSK "QPSK", Differential Binary PSK "DBPSK", Differential Quaternary PSK "DQPSK", etc.) are employed for transmission. In the frequency domain, different OFDM carriers are subject to different levels of fading, noise or interference. Therefore, for each carrier or perhaps frequency bin, the signal to noise plus interference ratio needs to be measured and used to improve the overall bit error rate (BER) performance of a receiver. The "noise plus interference" computation is done because both thermal conditions (noise) and signal(s) from other sources (interference) can adversely affect the carrier. In one embodiment, the invention describes a unique technique and architecture for symbol detection and the evaluation of the quality of different carriers. This evaluation results in a map vector to be used for transmission or combination of repeated symbols.

I. General Architecture

Referring to FIG. 1, an exemplary embodiment of an Orthogonal Frequency Division Multiplexing (OFDM) receiver 100 is shown. The OFDM receiver 100 includes an analog front end (AFE) 110, a synchronization detection logic 120, a fast fourier transform (FFT) logic 130, an OFDM demodulator 140 and a channel estimation logic 150.

More specifically, the AFE 110 receives an input OFDM signal, samples information embodied in the OFDM signal, and converts such information from an analog format into a digital format. Examples of such information include OFDM symbol(s). As an option, AFE 110 may perform signal conditioning operations (e.g., gain control, filtering, etc.) on the information prior to or subsequent to such conversion. The AFE 110 provides the digital information to the FFT logic 130. Synchronized with a sampling rate supplied by the synchronization detection logic 120, the FFT logic 130 receives digital information associated with the OFDM signal and outputs symbols embodied in each carrier of the OFDM signal to both the OFDM demodulator 140 for detection and the channel estimation logic 150 for estimation of carrier quality. In one embodiment, the FFT logic 130 separates the symbols placed on each carrier associated with the OFDM signal.

Figure 2:
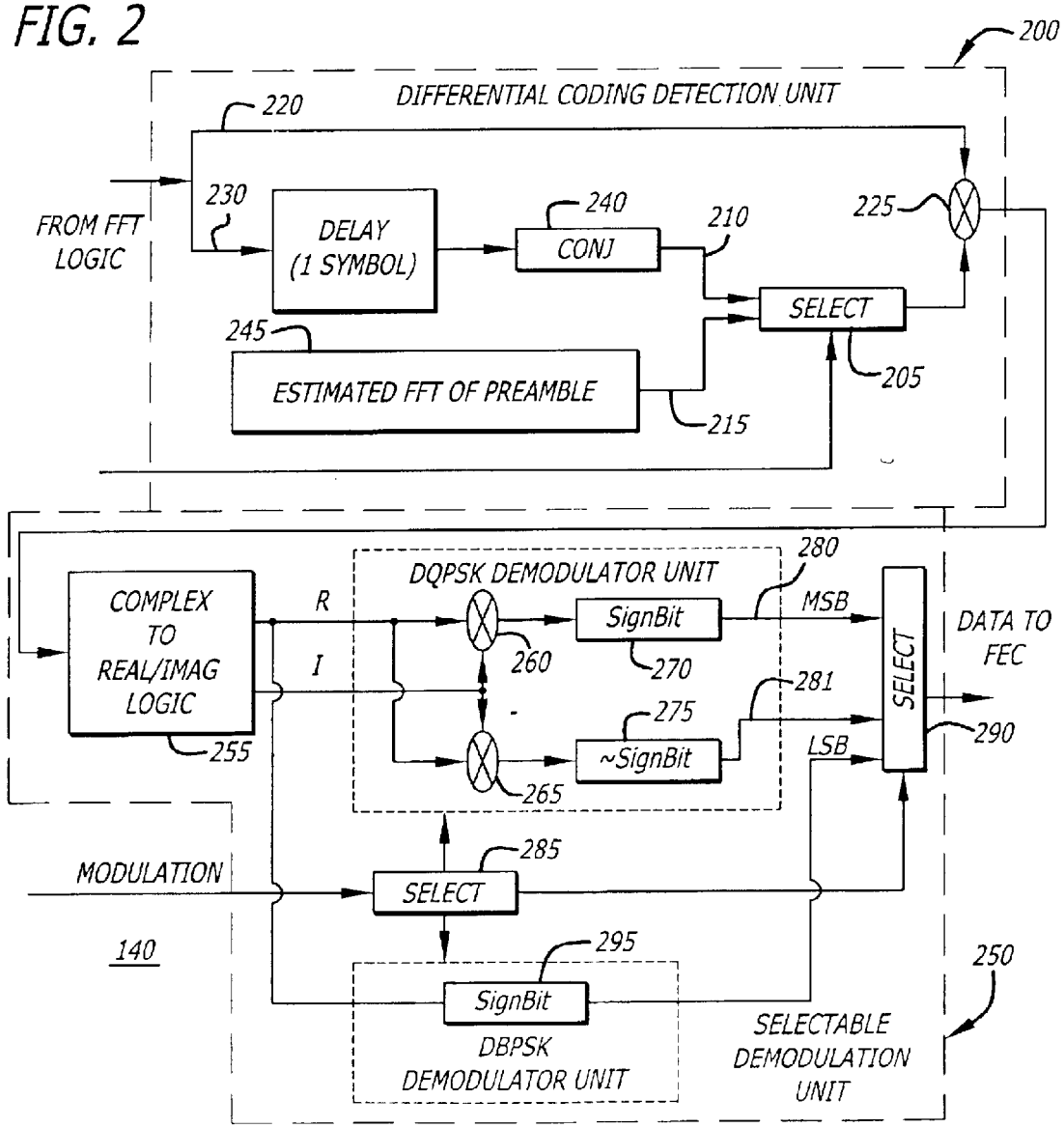
FIG. 2 is an exemplary embodiment of an OFDM demodulator where the input data is differentially coded.

Referring now to FIG. 2, an exemplary embodiment of the OFDM demodulator 140 is shown. For this embodiment, the OFDM demodulator 140 comprises a differential signal detection unit 200 and a selectable demodulation unit 250. Herein, detection of the type of received symbols is based on the location of the received symbols in accordance with a Real-Imaginary (Re-Imag) plane (referred to as a "complex plane").

For this embodiment, the differential coding detection unit 200 includes a select unit 205 (e.g., multiplexer) that outputs either (1) a frequency representation (e.g., FFT value) of a previous symbol received over a first input path 210 or (2) a frequency representation of a reference symbol that may have been extracted from a preamble of the input OFDM signal over a second input path 215. This allows for symbol-by-symbol differential coding and symbol-to-reference coding, respectively. The type of differential coding is selected by a transmitter to the OFMD receiver 100 by prior to transmission of OFMD signaling or perhaps accompanying such signaling.

As shown in FIG. 2, in accordance with handling symbol-by-symbol differential coding, a first path 220 provides a phase of a current symbol to a multiplier 225. A second path 230 provides the frequency representation of the current symbol, which undergoes a delay 235 (for M symbols, where M≧1). Hence, the conjugate value 240 of the frequency representation of the previous symbol (when M=1) is supplied to the multiplier 225. The phase associated with the carrier of the previous symbol is subtracted from the current symbol and detection is made based on the results. Namely, the phase difference between carriers over successive symbols can be determined after the complex frequency representation of the current symbol is multiplied by the complex conjugate values of the frequency representation of previous symbols. After comparing the phase of each symbol to that of the previous one, differential coding will be removed.

As further shown in FIG. 2, in accordance with handling symbol-to-reference differential coding, the first input path 210 provides a phase of a current symbol to the multiplier 225. The second input path 215, however, provides a frequency representation (e.g., FFT value) 245 of the reference symbol to the multiplier 225. The phase associated with the carrier of the reference symbol is subtracted from the phase of the current symbol and detection is made based on the results.

In general, the selectable demodulation unit 250 of the OFMD demodulator 140 is used to identify a segment (e.g., quadrature or half plane) of the complex plane that the carrier is received in without having to compute the phase of the complex differential signal. The decision is based on the comparison of Real and Imaginary components of the received carrier signal to decisions areas 310, 320, 330 and 340 formed by boundary constraint lines as shown in FIG. 3.

Figure 3A:
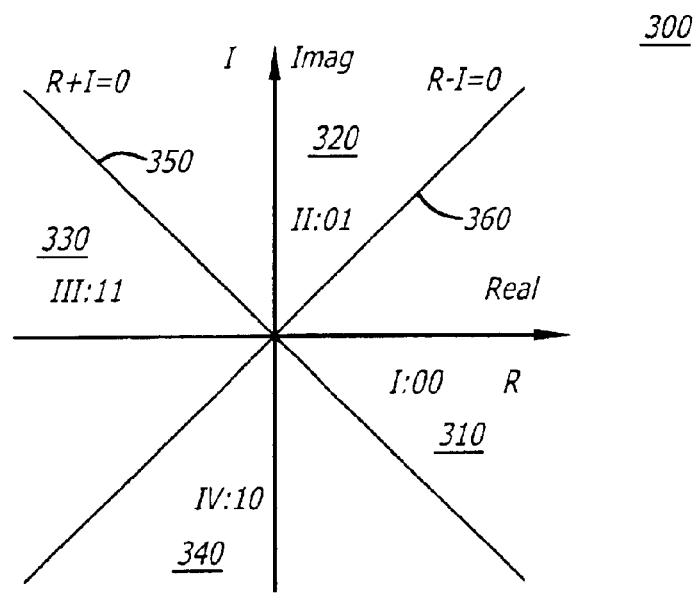
FIG. 3A is an exemplary embodiment of a graphical illustration of decision areas used for detection of symbols through analysis of Real and Imaginary components of a received carrier under Differential Quaternary Phase Shift Keying (DQPSK) demodulation.

More specifically, for this embodiment, the selectable demodulation unit 250 includes logic 255 to separate Real (R) value components of the phase difference from its Imaginary (I) value components. The phase difference is normally a complex value having Real and Imaginary components. For QPSK type demodulation, the decision areas are established by a set of boundary constraint lines 350 and 360 (R+I=0; R−I=0) as shown in FIG. 3A. These boundary constraint lines 350 and 360 are established through adders 260, 265 and sign bit extraction units 270, 275, which determine a sign bit of the resultant signed 2's complement representation of the phase difference. In other words, the sign bits of a signed 2's complement for (R+I) and NOT(I−R) are checked as shown in FIG. 2 and Table 1 below.

The sign bit extraction unit 270 accesses that the most significant bit of a signed 2's complement representation for R+I and outputs that bit value as the most significant bit (MSB) 280. Similarly, the sign bit extraction unit 275 accesses the most significant bit of a signed 2's complement representation for NOT(R−I) and outputs this bit value as the least significant bit (LSB) 281. The data is obtained by testing the result of the additions against four decision areas shown in FIG. 3A.

More specifically, as shown in FIG. 3A and Table 1, if the sign bit of the signed 2's complement of R+I (hereinafter referred to as "SignBit(R+I)") is equal to zero and an logical "Not" operation of a sign bit of the signed 2's complement of I−R (hereinafter referred to as "~SignBit(I−R)") is equal to "1", the received carrier signal is in decision area II 320 of a Real-Imaginary plane 300. As an arbitrary bit value, decision area II 320 is represented as detected bits being "01" (i.e., MSB="0" and LSB="1"). If SignBit(R+I) is equal to "1" and the ~SignBit(I−R) is equal to "0", the received carrier signal is in decision area IV 340 with "10" as the detected bit values. If both SignBit(R+I) and ~SignBit(I−R) are equal to "0", the received carrier signal is in decision area I 310 with "00" as the detected bit values. Otherwise, if both SignBit(R+I) and ~SignBit(I−R) are equal to "1", the received carrier signal is in decision area III 330 with "11" as the detected bit values. Of course, the decision areas associated with the detected bit values are for illustrative purposes and may be slightly altered for other embodiments. It is seen that an efficient technique for demodulation is obtained by evaluating the sign bits of (R+I) and NOT(I−R) of carriers as shown in FIGS. 2 and 3A.

TABLE 1

| Area | SignBit(R+I) | ~SignBit(I−R) | Detected Bits |
| --- | --- | --- | --- |
| I | 0 | 0 | 00 |
| II | 0 | 1 | 01 |
| III | 1 | 1 | 11 |
| IV | 1 | 0 | 10 |

Figure 3B:
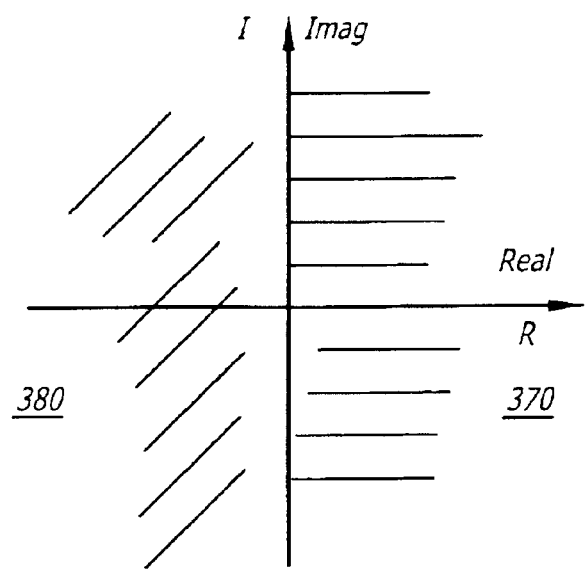
FIG. 3B is an exemplary embodiment of a graphical illustration of decision areas used for detection of symbols through analysis of Real components of a received carrier under Differential Binary Phase Shift Keying (DBPSK) demodulation.

Referring to FIGS. 2 and 3B, for BPSK type demodulation, the sign bit of the Real component of each phase difference is extracted by the sign bit extraction unit 295 and considered as the information bit. Thus, as shown in FIG. 3B as an example, if the sign bit is equal to a "0", this relates to a first decision area 370. Herein, the detected bit associated with the first decision area 370 is "0". However, if the sign bit indicates that Real component of the phase difference is equal to "1", a detected bit associated with a second decision area 380 is equal to "1". Of course, this detection method may be generalized for higher order PSK modulated data by evaluating the signs of $\pm(R\pm\alpha I)$, where "$\alpha$" is determined by the decision areas of each particular modulation order.

Referring again back to FIG. 2, the OFDM demodulator 140 includes a first select unit 285 that enables the OFDM demodulator 140 to support multiple types of PSK demodulation techniques such as DQPSK and DBPSK for example. The output of the first select unit 285 is routed to a second select unit 290, which produces the detected bit(s) for transfer to an error correction unit (not shown).

II. Channel Estimation

The process of channel estimation, namely to determine the quality of carriers to be used for transmission, is performed by channel estimation logic 150 of FIG. 2. This logic 150 examines the received carriers over N symbols (where "N" is a positive whole number) so that there will be N points on the complex plane 300 for each carrier.

Figure 4:
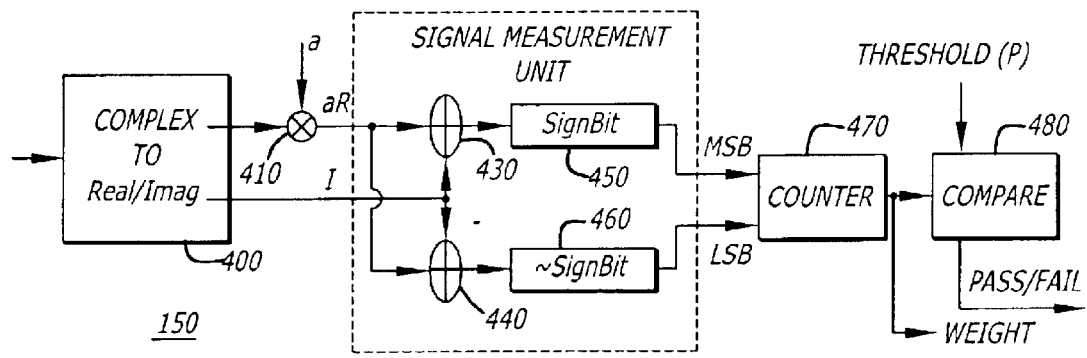
FIG. 4 is an exemplary embodiment illustrating operations for channel estimation for BPSK signaling.

Referring to FIG. 4, an exemplary embodiment illustrating operations for channel estimation for BPSK signaling is shown. For this embodiment, the channel estimation logic includes logic 400 to separate each Real (R) value component of the phase differences from its corresponding Imaginary (I) value component. The phase difference is normally a complex value having Real and Imaginary components (R+I). For BPSK type demodulation, the estimation areas are established by a set of boundary constraint lines 510 and 520 (aR+I=0; aR−I=0). These boundary constraint lines 510 and 520 are established through a multiplier 410 and a signal measurement unit 420. The multiplier 410 computes a parameterized Real component "aR". The parameter "a" is calculated based on an acceptable BER level.

Figure 5:
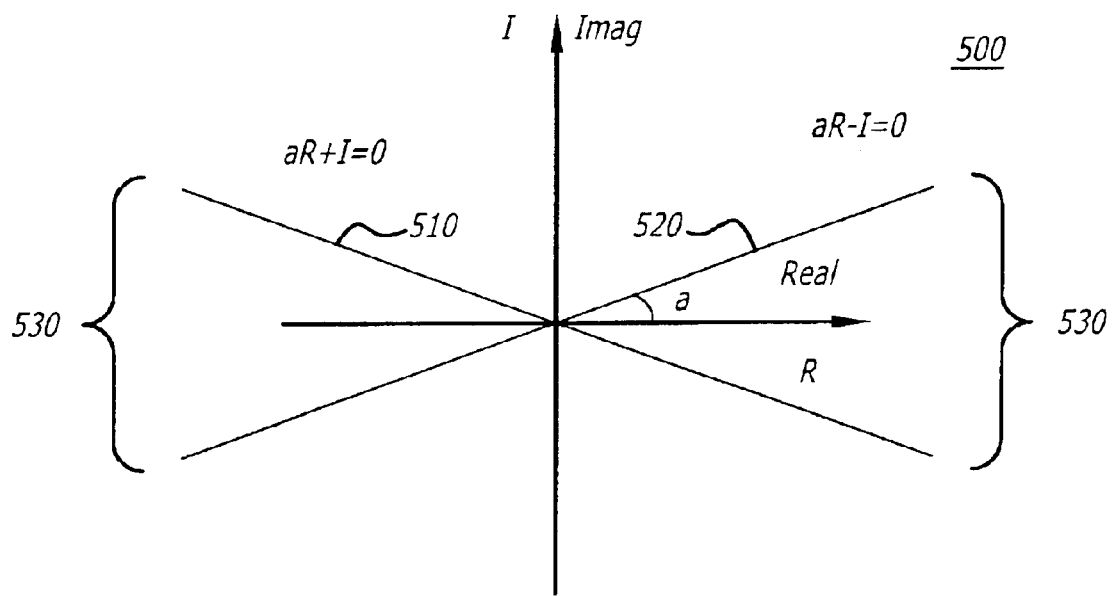
FIG. 5 is an exemplary embodiment of a graphical illustration of estimation areas used for channel estimation for BPSK signaling.

The signal measurement unit 420 comprises adders 430 and 440 along with sign bit extractor units 450 and 460. As shown in FIG. 5, for N symbols, successive signed 2's-complement representations for SignBit(aR+I) and logical NOT operations for SignBit(aR−I) (hereinafter referred to as "~SignBit(aR−I)") are computed to determine how many symbols falls within the estimation area 530. If at least "P" symbols falls within the estimation area 530 (P≦N and P is a selected threshold), the carrier is estimated to be reliable. This may warrant more data to be encoded on the carrier. Otherwise, if less than "P" symbols are determined to fall inside the estimation area 530 of a Real-Imaginary plane 500, the received carrier is determined to be unreliable. Such unreliability may require the carrier to be non-data carrying or encoded with less data than normal.

The quality of a carrier depends on fading, noise and interference levels received in each frequency bin, measured based on the variance of the N received samples. Higher levels of noise and interference will scatter the representations for the received symbols further around the signal constellation. Herein, in this embodiment, the estimation area 530 is limited to a smaller portion of complex plane 500 as described. This area is defined based on selected acceptable noise and interference level. In one type of application, a frequency bin will be used for transmission, if a certain percentage of the N symbols on that bin fall within the specified limited area. Another type of application is when multiple copies of a symbol are transmitted over different frequency bins (frequency diversity). In this type of application, the percentage may be used as the combining ratio of the transmitted symbol over the frequency bin. As shown in FIG. 5, the estimation areas used for channel estimation in DBPSK mode are shown.

For the embodiment of the channel estimation logic 150 of FIG. 4, the received carrier is compared to the limited boundary and a counter 470 will count this carrier if it falls within the limits. For each carrier, this process will be repeated over N symbols. Handled by a comparator 480, the total count determined by the counter 470 is then compared to a threshold (T) to declare pass or fail for this carrier, or its value may be used as its ratio in diversity combining. Based on one of the four combinations obtained for LSB and MSB, the comparator 480 will determine that the received signal is placed in which region of FIG. 5. (e.g. values "11" and "00" can indicate reception in the region 530 of FIG. 5). For this embodiment, the counter 470 simply counts the occurrence of all receptions in region 530.

Figure 6:
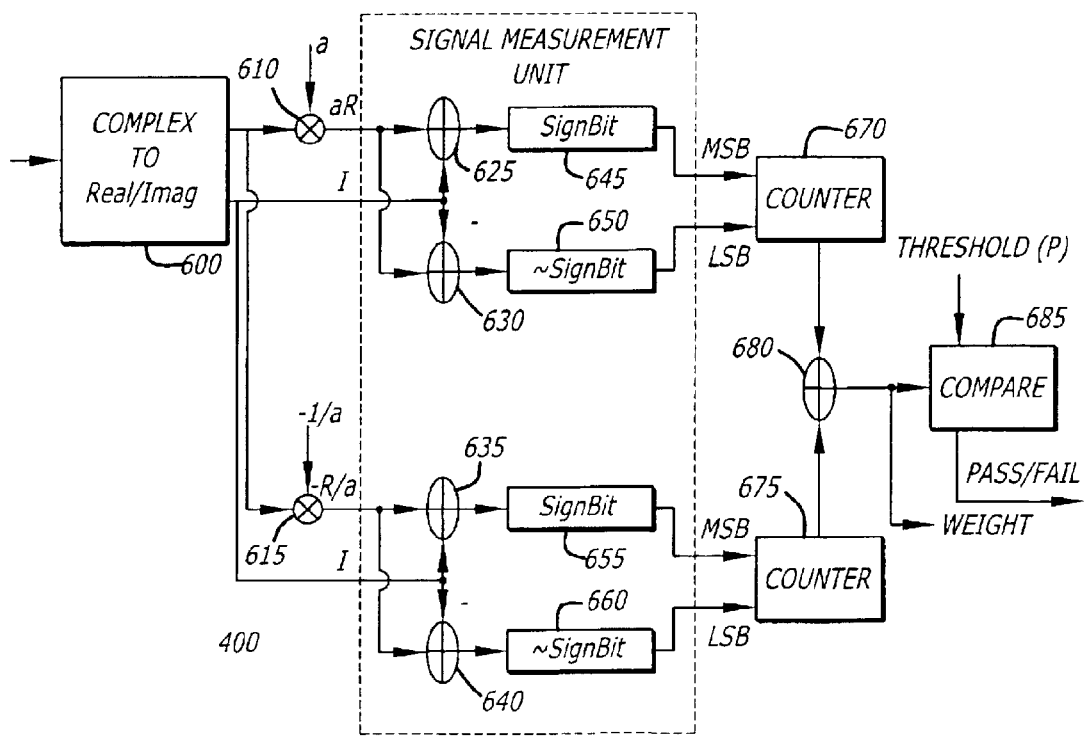
FIG. 6 is an exemplary embodiment illustrating operations for channel estimation for QPSK signaling.

Referring to FIG. 6, an exemplary embodiment illustrating operations for channel estimation for QPSK signaling is shown. For this embodiment, the channel estimation logic 150 includes logic 600 to separate Real (R) value components of the phase difference from its Imaginary (I) value components. The phase difference is normally a complex value having Real and Imaginary components (R+I). For QPSK type demodulation, the estimation areas are established by two sets of boundary constraint lines 705, 710 and 715, 720 (aR+I=0 and aR−I=0; −R/a−I=0 and −R/a+I=0), where the number of received signals will be counted in all four resultant boundary constraint regions 725, 730, 735 and 740 for better accuracy.

Figure 7:
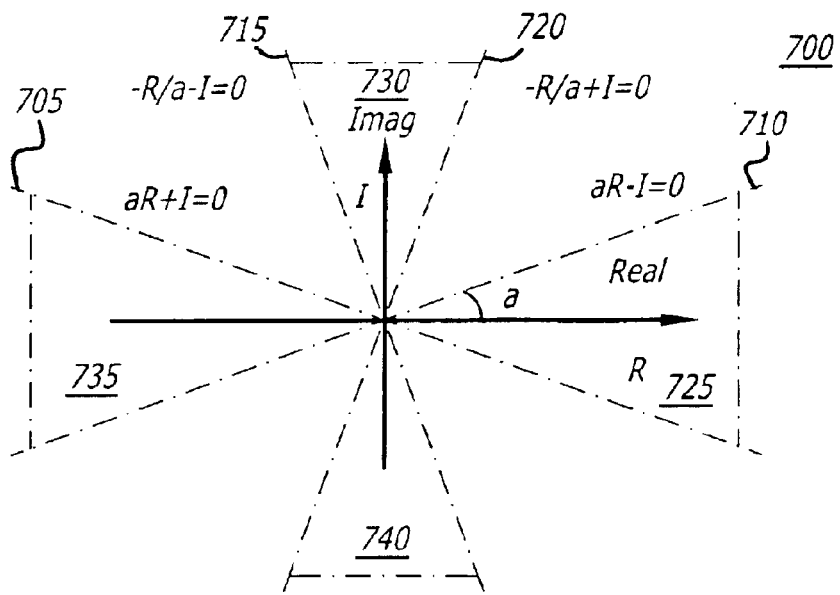
FIG. 7 is an exemplary embodiment of a graphical illustration of estimation areas used for channel estimation for QPSK signaling.

As shown in FIG. 7, these boundary constraint lines 705, 710, 715 and 720 are established through a pair of multipliers 610 and 615 and a signal measurement unit 620. The multiplier 610 computes a parameterized Real component "aR" while multiplier 615 computes Real component "−R/a". As mentioned above, the parameter "a" is calculated based on an acceptable BER level.

The signal measurement unit 620 comprises adders 625, 630, 635 and 640 along with sign bit extraction units 645, 650, 655 and 660. As shown, for N symbols, successive signed 2's-complement representations for the phase differences (aR+I), (−R/a+I), (aR−I) and (−R/a−I) is conducted. The signed 2's-complement representation of the phase differences are computed to determine how many symbols fall within the boundary constraint area 530. This may be accomplished by extracting a sign bit for 2's complement representations of phase differences (aR+I) and (−R/a+I) as well as (aR−I) and (−R/a−I) after undergoing a logical NOT operation.

As a result, if SignBit(aR+I) and ~SignBit(aR−I) is equal to "01", the particular symbol is associated with estimated area 725 of a complex plane 700. If SignBit(aR+I) and ~SignBit(aR−I) is equal to "10", the received symbol is associated with estimated area 735 of the complex plane 700. Similarly, if SignBit(−R/a+I) and ~SignBit(−R/a−I) is equal to "01", the received symbol is associated with estimated area 730 of the complex plane 700. If SignBit(−R/a+I) and ~SignBit(−R/a−I) is equal to "10", the symbol is associated with estimated area 740.

The quality of a carrier depends on fading, noise and interference levels received in each frequency bin, measured based on the variance of the N received samples. Higher levels of noise and interference will scatter the received points further around the signal constellation. Herein, in this embodiment, the estimation area is limited to a smaller portion of complex plane 500. This area is defined based on selected acceptable noise and interference level. In one type of application, a frequency bin will be used for transmission, if a certain percentage of the N symbols on that bin fall within the specified limited area. Another type of application is when multiple copies of a symbol are transmitted over different frequency bins (frequency diversity). In this type of application, the percentage may be used as the combining ratio of the transmitted symbol over the frequency bin. As shown in FIG. 7, the decision areas used for channel estimation in DQPSK mode are shown.

For this embodiment of the channel estimation logic 150, the received carrier is compared to the limited boundary constraint lines and counters 670 and 675 will count this symbol upon falling within an estimation area 725, 730, 735 or 740. For this embodiment, a counter may be used in which a count is incremented upon receipt of a MSB and LSB having opposite logical values. For each carrier, this process will be repeated for the N symbols. The total count, being a sum computed by the adder 680 upon being supplied count values by the counters 670 and 675, is then compared by a comparison logic 685 to a threshold (P). The comparison is conducted to declare pass or fail for this carrier (i.e., total count$\geq$P).

In the alternative, the total count value may be used as its ratio in diversity combining. More specifically, the percentage of values that are received over a certain tone and fall within the specified area, can be used to assign a figure of merit to indicate the quality of that tone. This "figure of merit" can be used as a weight for the detected bits, which can be used in soft detection algorithms or maximal ratio combining techniques.

Again, similar to the detection method, the channel estimation method may be generalized for higher order PSK modulated data.

Figure 8:
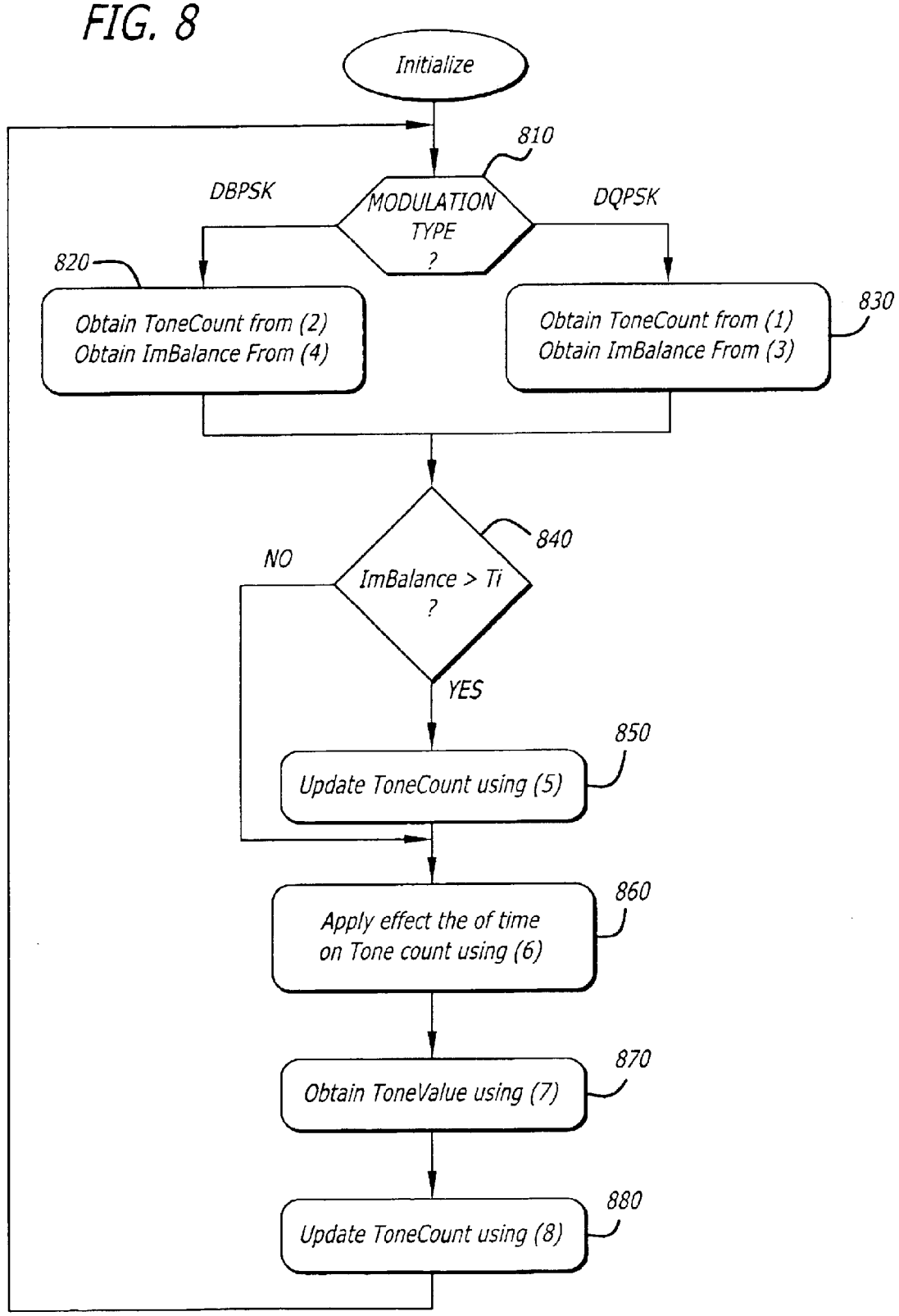
FIG. 8 is a flowchart of a software module for channel estimation in accordance with BPSK and QPSK signaling.

Referring now to FIG. 8, a flowchart of a software module for channel estimation in accordance with BPSK and QPSK signaling is shown. For this embodiment, channel estimation is performed by a software module, which receives the channel measurement results from hardware and produces the required tone mapping, modulation and coding rate for a given transmitter as well as soft channel weights for maximal ratio combining in the receiver.

Once a new measurement of the total count over four regions (ToneCountR, ToneCountL, ToneCountU and ToneCountD) is received from hardware, overall (all four regions) measure of quality or ToneCount is calculated for each carrier (see blocks 820 and 830). The method of calculation differs between the QPSK and BPSK modulation schemes. For example, for DQPSK, the total count is determined by a first calculation method:

$$\text{ToneCount}(n)=128\times(\text{ToneCountR}(n)+\text{ToneCountL}(n)+\text{ToneCountU}(n)+\text{ToneCountD}(n))\text{ for }n=0,\ldots,N-1 \quad (1)$$

And for DBPSK, the total count is determined by a second calculation method as shown in block 830:

$$\text{ToneCount}(n)=128\times(\text{ToneCountR}(n)+\text{ToneCountL}(n))\text{ for }n=0,\ldots,N-1 \quad (2)$$

A "scaler," selected to be any predetermined value such as "128," is optionally used to reduce round-off noise in future calculations. A higher ToneCount value normally indicates a better quality for a specific carrier. To combat the effect of the narrowband interference, an index called "ImBalance" is calculated for each carrier (see also blocks 820 and 830). Those carriers that are affected by the narrowband interference are reduced in value using the ImBalance index. For DQPSK, the ImBalance index is equal to the following:

$$\text{ImBalance}(n)=|\text{ToneCountR}(n)-\text{ToneCountL}(n)|+|\text{ToneCountU}(n)-\text{ToneCountD}(n)|\text{ for }n=0,\ldots,N-1 \quad (3)$$

For DBPSK, the ImBalance index is equal to the following:

$$\text{ImBalance}(n)=|\text{ToneCountR}(n)-\text{ToneCountL}(n)|\text{ for }n=0,\ldots,N-1 \quad (4)$$

If the ImBalance index for any of the carriers is greater than a threshold Ti (see block 840), the carrier quality index or ToneCount is reduced in value. Otherwise, ToneCount for each carrier does not require a reduction. The new ToneCounts are then obtained as follows for equation (5) and block 850:

$$\text{ToneCount}(n) = \frac{\text{BlockSize} \times \text{ToneCount}(n)}{\text{BlockSize} + w \times \text{ImBalance}(n)} \quad (5)$$

-continued for $n = 0, \ldots, N-1$ and $w$ is a constant factor

After calculating per carrier quality measures or ToneCounts based on the latest estimation report from the hardware, an accumulated measure of carriers' quality is calculated using previously available channel information. This is called "ToneValue" or accumulated measure of quality for each carrier for a given ToneMap Index. The past estimate of the carriers' quality is blended with the new channel measurements or ToneCounts. The weight of the old measurements or ToneValues depends on the number of past channel observations and the time elapsed from the last received channel report. This time dependent variable is named "TotalCount". The following equations (6)–(8) show how TotalCount and ToneValues are updated (see blocks 860–880).

$$TotalCount = TotalCount \times \Lambda\left(\frac{t}{Ts}\right) \qquad (6)$$

$$ToneValue(n) = \frac{TotalCount \times ToneValue(n) + ToneCount(n)}{TotalCount + BlockSize} \qquad (7)$$

for $n = 0, \ldots, N-1$

TotalCount=TotalCount+BlockSize if TotalCount>L,
TotalCount=L  (8)

TotalCount is initially set to zero. TotalCount can be also reduced to zero when the old measurement is "stale" or when elapsed time from last measurement report (t) is greater than Ts (a predetermined value for stale time). The $\Lambda(t/Ts)$ function applies a linear factor between one and zero, where it is equal to one where t=0 and is equal to zero when t=Ts. For any time elapsed less than Ts, TotalCount can be proportionally reduced, lowering the weight of the old channel measurement. TotalCount is increased by the "BlockSize" of each new channel measurement report to a limited value of L.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, it may be possible to implement the invention or some of its features in hardware, firmware, software or a combination thereof.

What is claimed is:

1. A method comprising:
   receiving a multi-tone signal by a first fourier transform (FFT) logic;
   outputting symbols for each carrier of the multi-tone signal;
   computing a complex phase difference between a current symbol and a previous symbol;
   separating a real value component (R) from a corresponding imaginary value component (I) forming the complex phase difference;
   determining at least one boundary constraint line of a complex phase map for a selected demodulation scheme; and
   computing an arithmetic combination of the real value component and the corresponding imaginary value component to detect whether a series of bits falls within a selected region of the complex phase map defined by the at least one boundary constraint line.

2. The method of claim 1, wherein the previous symbol is received by a demodulator determining the complex phase difference prior to the current symbol.

3. The method of claim 2, wherein the previous symbol is received immediately prior to the current symbol.

4. The method of claim 1, wherein the at least one boundary constraint line for the complex phase map associated with a Quaternary Phase Shift Keying (QPSK) demodulation scheme includes a first boundary constraint line being equivalent to R+I=0 and a second boundary constraint line being equivalent to R−I=0.

5. The method of claim 1, wherein the at least one boundary constraint line for the complex phase map associated with a Binary Phase Shift Keying (BPSK) modulation scheme include a boundary constraint line being equivalent to I=0.

6. A method comprising:
   computing a complex phase difference between a current symbol and a previous symbol;
   separating a real value component (R) from a corresponding imaginary value component (I) forming the complex phase difference;
   determining at least one boundary constraint line of a complex phase map for a selected demodulation scheme; and
   computing an arithmetic combination of the real value component and the corresponding imaginary value component to detect whether a series of bits falls within a selected region of the complex phase map defined by the at least one boundary constraint line, the detection of the series of bits includes detecting a sign bit of the arithmetic combination being a signed 2's complement combination of an addition of the real value component and the imaginary value component.

7. The method of claim 6, wherein the detection of the series of bits further includes detecting a sign bit of a bitwise inversion of a signed 2's complement combination of a subtraction of the imaginary value component from the real value component.

8. The method of claim 1, wherein the detection of the series of bits includes detecting a sign bit of the real value component of the complex phase difference.

9. A method comprising:
   computing a complex phase difference between a current symbol and a previous symbol;
   separating a real value component (R) from a corresponding imaginary value component (I) forming the complex phase difference;
   determining at least one boundary constraint line of a complex phase map for a selected demodulation scheme;
   computing an arithmetic combination of the real value component and the corresponding imaginary value component to detect whether a series of bits falls within a selected region of the complex phase map defined by the at least one boundary constraint line; and
   performing a channel estimation operation on a carrier propagating a plurality of symbols, including the current symbol and the previous symbol, by counting a number of symbols that fall within an estimated area of the complex phase map, the estimated area being bounded by boundary constraint lines based on a parameterized real value component.

10. The method of claim 9 further comprising:
determining that the carrier is reliable if the number of symbols that fall within the estimated area is greater than a threshold value.

11. A method comprising:
determining a complex phase difference between a current symbol and a complex frequency representation operating as a reference symbol;
separating a real value component (R) from a corresponding imaginary value component (I) forming the complex phase difference;
determining at least one boundary constraint line of a complex phase map for a selected demodulation scheme; and
detecting a first series of bits if an arithmetic combination of the real value component and the corresponding imaginary value component falls within a first selected region of the complex phase map defined by the at least one boundary constraint line, the detecting of the first series of bits includes detecting a sign bit of the arithmetic combination being a signed 2's complement combination of an addition of the real value component and the imaginary value component.

12. The method of claim 11, wherein the detecting of the first series of bits further includes detecting a sign bit of a bitwise inversion of a signed 2's complement combination of a subtraction of the imaginary value component from the real value component.

13. A method comprising:
receiving a multi-tone signal by a fast fourier transform (FFT) logic;
outputting symbols for each carrier of the multi-tone signal;
determining a complex phase difference between a current symbol and a complex frequency representation operating as a reference symbol;
separating a real value component (R) from a corresponding imaginary value component (I) forming the complex phase difference;
determining at least one boundary constraint line of a complex phase map for a selected demodulation scheme; and
detecting a first series of bits if an arithmetic combination of the real value component and the corresponding imaginary value component falls within a first selected region of the complex phase map defined by the at least one boundary constraint line.

14. The method of claim 13, wherein the detecting of the first series of bits includes detecting a sign bit of the real value component of the complex phase difference.

15. A demodulator comprising:
a logic unit to separate a real value component (R) from a corresponding imaginary value component (I) forming a complex phase difference between two symbols;
a Quaternary Phase Shift Keying (QPSK) demodulator unit to receive the real value component and the imaginary value component from the logic unit and to detect at least two bit values;
a Binary Phase Shift Keying (BPSK) demodulator unit to receive the real value component from the logic unit and to detect a bit value being equivalent to a sign bit of the real value component;
a first select unit coupled to both the QPSK demodulator unit and the BPSK demodulator unit, the first select unit to select one of the QPSK demodulator unit and the BPSK demodulator unit to perform demodulation;
a second select unit coupled to the first select unit, the QPSK demodulator unit and the BPSK demodulator unit, the second select unit to route either an output of the QPSK demodulator unit or an output of the BPSK demodulator unit based on an output from the first select unit.

16. A method comprising:
separating a real value component (R) from a corresponding imaginary value component (I) forming a complex phase difference between two symbols provided over a carrier;
computing at least one parameterized real value component (aR) by multiplying the real value component (R) with a parameter (a);
for a plurality of symbols, counting a number of symbols that fall within an estimated area of a complex phase map associated with a selected demodulation scheme, the estimated area is bounded by boundary constraint lines based on the parameterized real value component; and
determining that the carrier is reliable if the number of symbols that fall within the estimated area is greater than a threshold value.

17. The method of claim 16 further comprising:
determining that the carrier is unreliable if the number of symbols that fall within the estimated area is less than the threshold value.

18. The method of claim 16, wherein the boundary constraint lines are equivalent to aR+I=0 and aR−I=0.

19. The method of claim 16, wherein the boundary constraint lines are equivalent to (i) aR+I=0, (ii) aR−I=0, (iii) −R/a−I=0, and (iv) −R/a+I=0.

20. A software module stored in a machine readable medium and executed by a processor, comprising:
a first software module to separate a real value component (R) from a corresponding imaginary value component (I) forming a complex phase difference between multiple symbols provided over a carrier;
a second software module to compute at least one parameterized real value component (aR) by multiplying the real value component (R) with a parameter (a);
a third software module to count a number of symbols that fall within an estimated area of a complex phase map associated with a selected demodulation scheme, the estimated area is bounded by boundary constraint lines based on the parameterized real value component; and
a fourth software module to determine that the carrier is reliable if the number of symbols that fall within the estimated area is greater than a threshold value and that the carrier is unreliable if the number of symbols that fall within the estimated area is less than the threshold value.

21. The method of claim 1, wherein the multi-tone signal is an Orthogonal Frequency Division Multiplexing (OFDM) signal.

22. The method of claim 13, wherein the multi-tone signal is an Orthogonal Frequency Division Multiplexing (OFDM) signal.

23. A method comprising:
receiving a multi-tone signal by a fast fourier transform (FFT) logic;

outputting symbols for each carrier of the multi-tone signal;

computing a complex phase difference between multiple symbols;

separating a real value component (R) from a corresponding imaginary value component (I) that collectively form the complex phase difference; and detecting a first series of bits based on an arithmetic combination of the real value component and the corresponding imaginary value component.

24. The method claim 23, wherein the multi-tone signal is an Orthogonal Frequency Division Multiplexing (OFDM) signal.

* * * * *